United States Patent
Mollison et al.

(10) Patent No.: US 6,493,632 B1
(45) Date of Patent: Dec. 10, 2002

(54) WATER SATURATION AND SAND FRACTION DETERMINATION FROM BOREHOLE RESISTIVITY IMAGING TOOL, TRANSVERSE INDUCTION LOGGING AND A TENSORIAL WATER SATURATION MODEL

(75) Inventors: Richard A. Mollison, Tomball, TX (US); Juergen S. Schoen, Leoben (AT); Otto N. Fanini, Houston, TX (US); Berthold Kriegshauser, Houston, TX (US); Milomir Pavlovic, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/474,049

(22) Filed: Dec. 28, 1999

Related U.S. Application Data (63) Continuation-in-part of application No. 09/222,967, filed on Dec. 30, 1998, now abandoned.
(60) Provisional application No. 60/160,943, filed on Oct. 22, 1999.

(51) Int. Cl.[7] ................................................. G01V 7/00
(52) U.S. Cl. ............................................. 702/2; 703/10
(58) Field of Search .................... 702/2, 7, 19; 324/303, 324/338; 340/855.5; 250/256; 73/152.03; 703/10

(56) References Cited

U.S. PATENT DOCUMENTS

| | | | |
|---|---|---|---|
| 5,335,088 A | | 8/1994 | Howard, Jr. ................ 324/339 |
| 5,355,088 A | * | 10/1994 | Howard, Jr. ................ 324/339 |
| 5,463,549 A | * | 10/1995 | Dussan et al. .............. 364/422 |
| 5,502,686 A | * | 3/1996 | Dory et al. .................. 367/34 |
| 5,550,473 A | | 8/1996 | Klein ......................... 324/338 |
| 5,656,930 A | | 8/1997 | Hagiwara .................... 324/339 |
| 5,671,136 A | * | 9/1997 | Willhoit, Jr. ................ 364/421 |
| 5,675,147 A | * | 10/1997 | Ekstrom et al. ............ 250/256 |
| 5,781,436 A | * | 7/1998 | Forgang et al. ............. 364/422 |
| 5,854,991 A | * | 12/1998 | Gupta et al. ................. 702/17 |
| 5,999,883 A | * | 12/1999 | Gupta et al. .................. 702/7 |
| 6,044,325 A | * | 3/2000 | Chakravarthy et al. ....... 702/7 |
| 6,255,819 B1 | * | 7/2001 | Day et al. ................... 324/303 |

OTHER PUBLICATIONS

J.H. Schoen, R.A. Mollison, D.T. Georgi; *Macroscopic Electrical Anistrophy of Laminated Reservoirs: A Tensor Resistivity Saturation Model*, SPE 56509, 1999, pp. 1–13. Oct. 3–6, 1999.

R.A. Mollison, J.S. Schön, O.N. Fanini, B. Kriegshäuser, W.H. Meyer and P.K. Gupta; *A Model for Hydrocarbon Saturation Determination from an Orthogonal Tensor Relationship in Thinly Laminated Anisotropic Reservoirs*: pp. 1–14. Dec. 28, 1999.

(List continued on next page.)

Primary Examiner—Edward Lefkowitz
Assistant Examiner—Victor J. Taylor
(74) Attorney, Agent, or Firm—Madan, Mossman & Sriram, P.C.

(57) ABSTRACT

The total porosity of a formation, a fractional volume of the shale, and a resistivity of the shale are determined in a laminated reservoir including sands that may have dispersed shales therein. A tensor petrophysical model determines the laminar shale volume and laminar sand conductivity from vertical and horizontal conductivities derived from multi-component induction log data. The volume of dispersed shale and the total and effective porosities of the laminar sand fraction are determined using a Thomas-Stieber-Juhasz approach. Removal of laminar shale conductivity and porosity effects reduces the laminated shaly sand problem to a single dispersed shaly sand model to which the Waxman-Smits equation can be applied.

30 Claims, 4 Drawing Sheets

OTHER PUBLICATIONS

D.R. Beard, et al., "A New, Fully Digital, Full–Spectrum Induction Device for Determining Accurate Resistivity with Enhanced Diagnostic and Integrity Verification," SPWLA 37th Annual Logging Symposium, Jun. 16–19, 1996, Paper B, pp. 1–8, Figs. 1–17

Dave Beard, et al., "Practical Applications of a New Multichannel and Fully Digital Spectrum Induction System," 1996 SPE Annual Technical Conference and Exhibition, Oct. 6–9, 1996, SPE 36504, pp. 99–109.

Teruhiko Hagiwara, "Macroscopic Anisotrophy" Approach to Analysis of Thinly Laminated Sand/Shale Sequences: Sensitivity Analysis and Sand Resistivity Estimate and Environmental Corrections, 1997 Annual Technical Conference and Exhibition, Oct. 5–8, 1997, SPE 38669, pp. 275–286.

J. Xiao, et al., "A Practical Dipping–Effect Correction for Multiarray Induction Tools in Deviated Wells," SPWLA 37th Annual Logging Symposium, Jun. 16–19, 1996, pp. 1–5, Figs. 1–12.

J. Xiao, et al., "A Petrophusics–Based Resolution–Enhancement Technique for Array–Type Induction Logs," SPWLA 39th Annual Logging Symposium, May 26–29, 1998, Paper XX, pp. 1–14.

Q. Zhou, et al., "Numerical Focusing of Induction Logging Measurements," 12th workshop in electromagnetic induction in earth, International Union of Geodesy and Geophysics. Aug. 8–14, 1994, pp. 1–6, Figs. 1–4.

A. Poupon et al., "A Contribution to Electrical Log Interpretation in Shaly Sands," Petroleum Branch Fall Meeting, Oct. 19–21, 1953, T. P. 3800, pp. III–120.

M. H. Waxman, "Electrical Conductivities in Oil–Bearing Shaly Sands," SPE 42nd Annual Fall Meeting, Oct. 1–4, 1967, pp. V–145–V160.

J.D. Klein, P.R. Martin, D.F. Allen;"The Petrophysics of Electrically Anisotropic Reservoirs" The Log Analyst, May–Jun. 1997, pp. 25–36; *Technical Note*, Saturation Effects on Electrical Anisotropy, J.D. Klein, Jan.–Feb. 1996, pp. 47–49.

T.D. Barber and R.A. Rosthal, "Using a Multiarray Induction Tool to Achieve High–Resolution Logs With Minimum Evironmental Effects," SPE 6th Annual Technical Conference and Exhibition, 1991, SPE 22725, pp. 637–651. Jan. 1, 1991.

T. Barber, et al., "A Multiarray Induction Tool Optimized for Efficient Wellsite Operation," 1995 Annual Technical Conference and Exhibition, 1995, SPE 30583, pp. 549–561. Jan. 1, 1995.

* cited by examiner

WATER SATURATION AND SAND FRACTION DETERMINATION FROM BOREHOLE RESISTIVITY IMAGING TOOL, TRANSVERSE INDUCTION LOGGING AND A TENSORIAL WATER SATURATION MODEL

CROSS-REFERENCES TO RELATED APPLICATIONS

This application is a continuation-in-part of U.S. patent application Ser. No. 09/222,967 filed on Dec. 30, 1998 now abandoned. It further claims priority from U.S. Provisional Application Ser. No. 60/160,943 filed on Oct. 22, 1999.

BACKGROUND OF THE INVENTION

1. Field of the Invention

The invention is related generally to the field of interpretation of measurements made by well logging instruments for the purpose of determining the fluid content of earth formations. More specifically, the invention is related to methods for calculating fractional volumes of various fluids disposed in the pore spaces of earth formations where these earth formations include laminations of shale with reservoir rock that may include dispersed shales.

2. Background of the Art

A significant number of hydrocarbon reservoirs include deep water turbidite deposits that consist of thin bedded, laminated sands and shales. A common method for evaluating the hydrocarbon content of reservoirs is the use of resistivity measurements. In interpretation techniques known in the art, typically one or more types of porosity-related measurement will be combined with measurements of the electrical resistivity (or its inverse, electrical conductivity) of the earth formations to infer the fluid content within the pore spaces of the earth formations. The fractional volumes of connate water and hydrocarbons can be inferred from empirical relationships of formation resistivity Rt with respect to porosity and connate water resistivity such as, for example, the well known Archie relationship. In the Archie relationship fractional volume of water in the pore space is represented, as shown in the following expression, by Sw—known as "water saturation":

$$S_w^n = \frac{R_0}{R_t} = \frac{1}{R_t} \frac{aR_w}{\phi^m} \qquad (1)$$

where a and m are empirically determined factors which relate the porosity (represented by ($\Phi$)) to the resistivity of the porous rock formation when it is completely water-saturated ($R_0$), $R_w$ represents the resistivity of the connate water disposed in the pore spaces of the formation, and m represents an empirically determined "cementation" exponent, n is the saturation exponent.

Relationships such as the Archie formula shown in equation (1) do not work very well when the particular earth formation being analyzed includes some amount of extremely fine-grained, clay mineral-based components known in the art as "shale". Shale typically occurs, among other ways, in earth formations as "dispersed" shale, where particles of clay minerals occupy some of the pore spaces in the hydrocarbon-bearing earth formations, or as laminations (layers) of clay mineral-based rock interleaved with layers of reservoir-type rock in a particular earth formation.

In the case of dispersed shale, various empirically derived relationships have been developed to calculate the fractional volume of pore space which is capable of containing movable (producible) hydrocarbons. The fractional volume of such formations which is occupied by dispersed shale can be estimated using such well logging devices as natural gamma ray radiation detectors. See for example, M. H. Waxman et al, "Electrical Conductivities in Oil Bearing Shaly Sands", SPE Journal, vol. 8, no. 2, Society of Petroleum Engineers, Richardson, Tex. (1968).

In the case of laminated shale, the layers sometimes are thick enough to be within the vertical resolution of, and therefore are determinable by, well logging instruments such as a natural gamma ray detector. In these cases, the shale layers are determined not to be reservoir rock formation and are generally ignored for purposes of determining hydrocarbon content of the particular earth formation. A problem in laminated shale reservoirs is where the shale laminations are not thick enough to be fully determined using gamma ray detectors and are not thick enough to have their electrical resistivity accurately determined by electrical resistivity measuring devices known in the art.

Sands that have high hydrocarbon saturation are typically more resistive than shales. In reservoirs consisting of thin laminations of sands and shales, conventional induction logging tools greatly underestimate the resistivity of the reservoir: the currents induced in the formation by the logging tool flow preferentially through the conductive shale layers leading to an overestimate of the conductivity of the formation.

One method for estimating hydrocarbon content of earth formations where shale laminations are present was developed by Poupon. See A. Poupon et al, "A Contribution to Electrical Log Interpretation in Shaly Sands", Transactions AIME, Vol. 201, pp. 138–145 (1959). Generally the Poupon relationship assumes that the shale layers affect the overall electrical conductivity of the earth formation being analyzed in proportion to the fractional volume of the shale layers within the particular earth formation being analyzed. The fractional volume is typically represented by Vsh (shale "volume"). Poupon's model also assumes that the electrical conductivity measured by the well logging instrument will include proportional effects of the shale layers, leaving the remainder of the measured electrical conductivity as originating in the "clean" (non-shale bearing) reservoir rock layers as shown in the following expression:

$$\frac{1}{R_t} = (1 - V_{sh}) \left(\frac{aR_w}{\phi^m}\right)^{-1} S_w^n + \frac{V_{sh}}{R_{sh}} \qquad (2)$$

where $R_t$ represents the electrical resistivity (inverse of conductivity) in the reservoir rock layers of the formation and $R_{sh}$ represents the resistivity in the shale layers.

The analysis by Poupon overlooks the effect of anisotropy in the resistivity of a reservoir including thinly laminated sands and shales. Use of improper evaluation models in many cases may result in an underestimation of reservoir producibility and hydrocarbon reserves by 40% or more as noted by van den Berg and Sandor. Analysis of well logging instrument measurements for determining the fluid content of possible hydrocarbon reservoirs includes calculating the fractional volume of pore space ("porosity") and calculating the fractional volumes within the pore spaces of both hydrocarbons and connate water. As noted above, Archie's relationship may be used.

In thinly laminated reservoirs where the wavelength of the interrogating electromagnetic wave is greater than the thickness of the individual layers, the reservoir exhibits an anisotropy in the resistivity. This anisotropy may be detected by using a logging tool that has, in addition to the usual transmitter coil and receiver coil aligned along with the axis of the borehole, a receiver or a transmitter coil aligned at an angle to the borehole axis. Such devices have been well described in the past for dip determination. See, for example, U.S. Pat. No. 3,510,757 to Huston and U.S. Pat. No. 5,115,198 to Gianzero, U.S. Pat. No. 5,656,930 issued to Hagiwara discloses a method of determining the horizontal resistivity, the vertical resistivity, and the anisotropy coefficient of a subterranean formation by means of an induction type logging tool positioned in a deviated borehole within the subterranean formation. In a preferred implementation, the induction type logging tool is first calibrated to determine a proportionality constant. A predetermined relationship between the proportionality constant, the phase shift derived resistivity, the attenuation derived resistivity, the horizontal resistivity, the vertical resistivity, and the anisotropy coefficient is then generated and stored in the memory of a programmed central processing unit. During an induction logging operation, the phase shift derived resistivity and attenuation derived resistivity are then received and processed by the programmed central processing unit in accordance with the predetermined relationship to generate the horizontal resistivity, the vertical resistivity, and the anisotropy coefficient. These measured values of horizontal and vertical resistivities when combined with a predetermined relationship between the horizontal resistivity, the vertical resistivity, the net/gross ratio, and the ratio of the sand layer resistivity to the shale layer resistivity make it possible to obtain a net/gross ratio. However, there are many laminated reservoirs in which the sands may include dispersed shales. Interpretation of formation water saturation in such reservoirs can be in error if the combined effects of laminations, dispersed shales within the sand, and possible intrinsic anisotropy of the shales is not considered.

There is a need for a method of determining the properties of a laminated reservoir that includes shales, clean sands and sands having dispersed clay therein. Such a method should preferably determine the water saturation of the sands in order to give a more accurate estimate of the productive capacity of the reservoir. Such a method should preferably make as few assumptions as possible about the properties of the sands and the shales. The present invention satisfies this need.

SUMMARY OF THE INVENTION

The present invention is method of accounting for the distribution of shale in a reservoir including laminated shaly sands using vertical and horizontal conductivities derived from multi-component induction data. Along with an induction logging tool, data may also be acquired using a borehole resistivity imaging tool. The data from the borehole resistivity imaging tool give measurements of the dip angle of the reservoir, and the resistivity and thickness of the layers on a fine scale. The measurements made by the borehole resistivity imaging tool are calibrated with the data from the induction logging tool that gives measurements having a lower resolution than the borehole resistivity imaging tool. A tensor petrophysical model determines the laminar shale volume and laminar sand conductivity from vertical and horizontal conductivities derived from the log data. The volume of dispersed shale and the total and effective porosities of the laminar sand fraction are determined using a Thomas-Stieber-Juhasz approach. Removal of laminar shale conductivity and porosity effects reduces the laminated shaly sand problem to a single dispersed shaly sand model to which the Waxman-Smits equation can be applied.

DETAILED DESCRIPTION OF THE INVENTION

Figure 2:
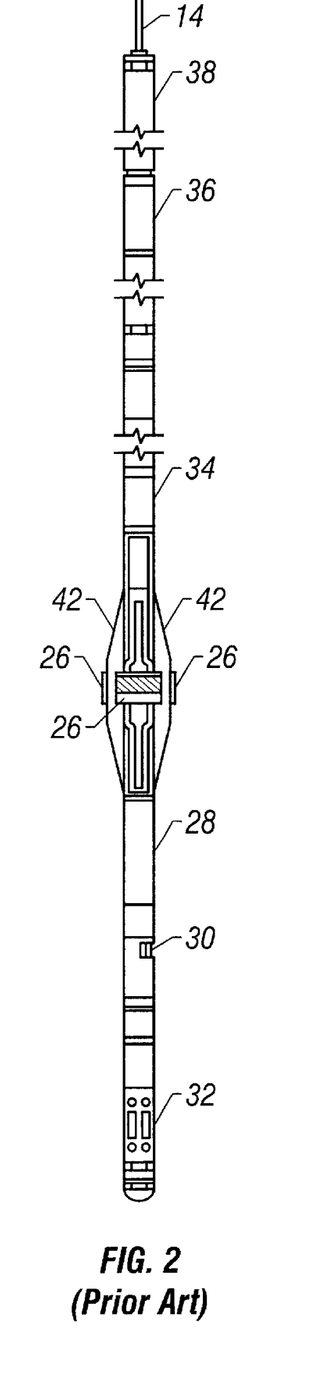
FIG. 2 (PRIOR ART) is a mechanical schematic view of the imaging tool of FIG. 1.
Figure 2A:
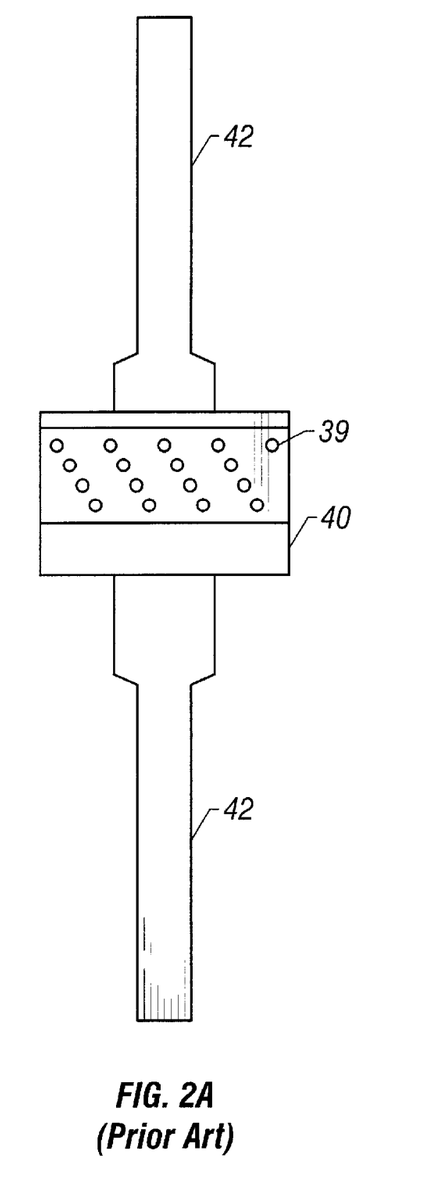
FIG. 2A (PRIOR ART) is a detail view of an electrode pad for the tool of FIGS. 1, 2.
Figure 3:
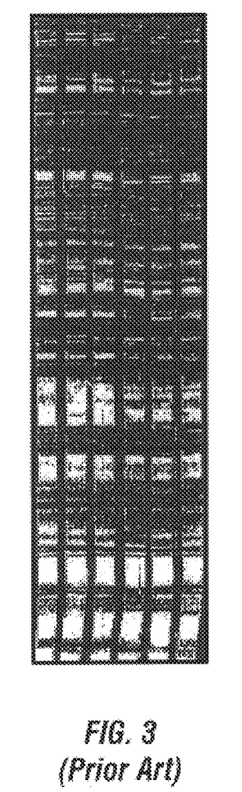
FIG. 3 (PRIOR ART) is a pictorial view of a composite imaging log obtained by merging the resistivity image data shown in acoustic image data.
Figure 4:
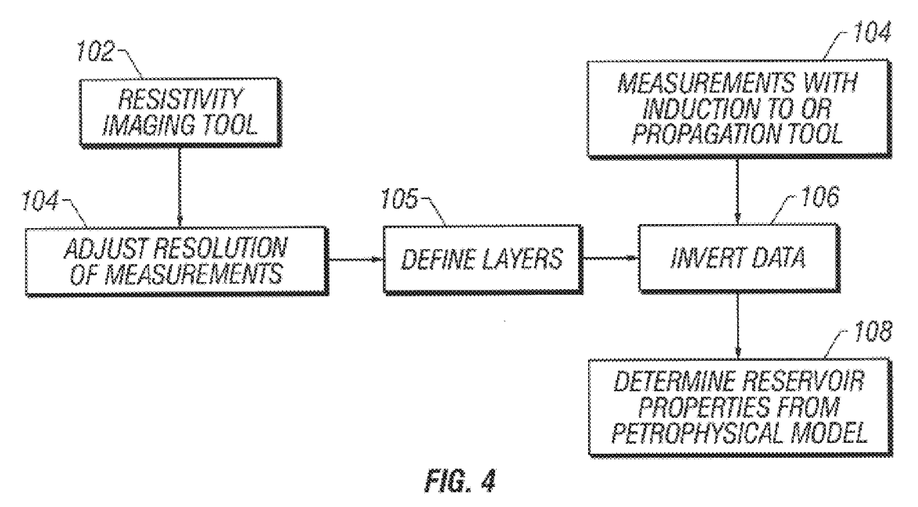
FIG. 4 is a flow chart illustrating the principal steps of the process of the invention.

The present invention is best understood by referring to FIGS. 1–6. FIG. 4 is a schematic flowchart of the major steps of the process used in the present invention.

Referring now to FIG. 4, one optional embodiment of the invention starts with data acquired by a borehole resistivity imaging tool 102 such as is described in U.S. Pat. No. 5,502,686 issued to Dory et al., and the contents of which are fully incorporated here by reference. It should be noted that the Dory patent is an example of a device that can be used for obtaining measurements borehole resistivity measurements: any other suitable device could also be used.

Figure 1:
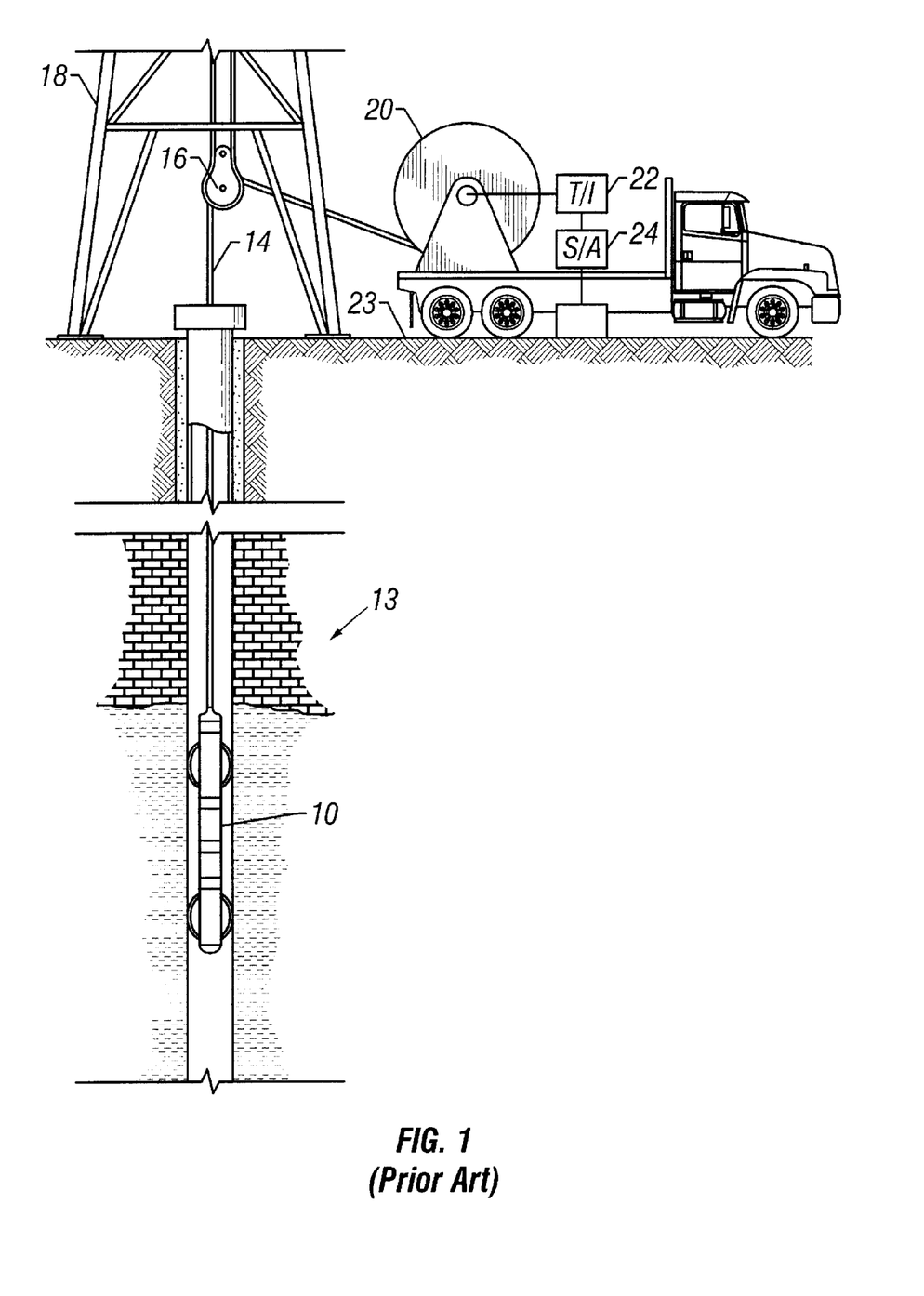
FIG. 1 (PRIOR ART) shows a resistivity imaging tool suspended in a borehole.

FIG. 1 shows a composite imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives digital data back which may be recorded on an archival storage medium of any desired type for concurrent or later processing. A data processor 24, such as a suitable computer, may be provided for performing data analysis in the field in real time or the recorded data may be sent to a processing center or both for post processing of the data.

FIG. 2 is a schematic external view of the unified borehole sidewall imager system. This may be used to provide the data that may be used in an optional embodiment of the invention. The tool 10 comprising the imager system includes four important components: 1) resistivity arrays 26; 2) electronics modules 28 and 38; 3) a mud cell 30; and 4) a circumferential acoustic televiewer 32. All of the components are mounted on a mandrel 34 in a conventional well-known manner. The outer diameter of the assembly is about 5.4 inches and about five feet long. An orientation module 36 including a magnetometer and an inertial guidance system is mounted above the imaging assemblies 26 and 32. The upper portion 38 of the tool 10 contains a telemetry module for sampling, digitizing and transmission of the data samples from the various components uphole to surface electronics 22 in a conventional manner. Preferably the acoustic data are digitized although in an alternate arrangement, the data may be retained in analog form for transmission to the surface where it is later digitized by surface electronics 22.

Also shown in FIG. 2 are three resistivity arrays 26 (a fourth array is hidden in this view). Referring to FIGS. 2 and 2A, each array includes 32 electrodes or buttons identified as 39 that are mounted on a pad such as 40 in four rows of eight electrodes each. Because of design considerations, the respective rows preferably are staggered as shown, to improve the spatial resolution. For reasons of clarity, less than eight buttons are shown in FIG. 2A. For a 5.375" diameter assembly, each pad can be no more than about 4.0 inches wide. The pads are secured to extendable arms such as 42. Hydraulic or spring-loaded caliper-arm actuators (not shown) of any well-known type extend the pads and their electrodes against the borehole sidewall for resistivity measurements. In addition, the extendable caliper arms 42 provide the actual measurement of the borehole diameter as is well known in the art. Using time-division multiplexing, the voltage drop and current flow is measured between a common electrode on the tool and the respective electrodes on each array to furnish a measure of the resistivity of the sidewall (or its inverse, conductivity) as a function of azimuth.

The acoustic imager that forms the circumferential borehole imaging system 32 provides 360° sampling of the sidewall acoustic reflectivity data from which a continuous acoustic imaging log or sonogram can be constructed to provide a display of the imaged data.

The borehole resistivity imaging tool arrays necessarily allow sampling only across preselected angular segments of the borehole sidewall. From those data, a resistivity imaging log, consisting of data strips, one strip per array, separated by gaps, can be constructed and displayed. The angular width of each data-scan strip is equal to $2 \sin^{-1} \{S/(2R)\}$, where S is the array width and R is the borehole radius. The common data from the two imagers are merged together in a data processing operation to provide a substantially seamless display as shown in FIG. 3. The merging incorporates equalizing the dynamic range of the resistivity measurements with respect to the acoustic measurements. That balance is essential in order that the continuity of a displayed textural feature is not distorted when scanning across a resistivity segment of the display, between adjacent acoustic segments.

The display in FIG. 3 incorporates measurements from directional sensors to align the resistivity measurements with geographical coordinates (North, East, South, West), with the resistivity image being "unfolded" to provide a flat image of the cylindrical surface of the borehole. Those versed in the art would recognize that when a plane intersects a circular cylinder at an angle, the unrolled image of the plane would appears as a sinusoid. The display in FIG. 3 shows many such sinusoids, some corresponding to bedding planes and others corresponding to fractures. The dip angle and the dip direction corresponding to the various sinusoids are determined in the present invention using known methods. When these data are combined with measurements from other logs, such as a gamma ray or a neutron log, discrete layers of different lithologies may be identified. In particular, over a gross interval of the order of several meters or so, the fractional volume of laminated shale present in a laminated reservoir may be determined.

With flat dips, the sinusoids have essentially zero amplitude. In one aspect of the present invention, the resistivity measurements are averaged circumferentially and vertically within each identified layer to give an average resistivity measurement for each layer identified above. Once this is done, the subsurface may be characterized by a number of plane layers, each of which has a constant resistivity. With the resolution of the button-electrode tool, these layers may range in thickness from a few millimeters to a few centimeters.

Those versed in the art would recognize that when the bed boundaries are dipping, then the currents into the electrodes, particularly those in the dip direction, on the pads may not be confined to a single layer and hence not represent the resistivity of the layer at the borehole. In one aspect of the invention, the averaging described above is limited to electrodes in the strike direction: these measurements would be more likely representative of the true formation resistivity at the depth of measurement.

The resistivity measurements obtained by the averaging process correspond to layers that are beyond the resolution of electromagnetic induction logging tools or propagation resistivity tools. Accordingly, the resistivity measurements obtained at this point are averaged to give resistivities on a scale that would be measurable by an induction logging tool. This is depicted by 104 in FIG. 5.

As would be known to those versed in the art, a finely laminated sequence of layers having different resistivities exhibits a transverse isotropy on a larger scale where the wavelength of the electromagnetic wave is much greater than the layer thickness. This condition is easily satisfied even for propagation resistivity tools that, e.g., operate at a frequency of 2 MHz (with a wavelength $\lambda \approx 6$ meters); for induction logging tools that have frequencies of the order of 50 kHz to 200 kHz, the wavelengths are even longer. For such interrogating frequencies, the layered medium is characterized by a horizontal resistivity $R_h^*$ and a vertical resistivity $R_v^*$ given by:

$$R_v^* = \frac{1}{W} \sum_{W_i} R_i \Delta h \quad (3)$$

and $$(R_h^*)^{-1} = \frac{1}{W} \sum_{W_i} \frac{\Delta h}{R_i} \quad (4)$$

where $W_i$ is a window used to average the resistivities, $\Delta h$ is the depth sampling interval of the electrodes, and $R_i$ is the measured resistivity for a given depth.

In this invention, the terms "horizontal" and "vertical" are to be understood in terms of reference to the bedding planes and the anisotropy axes of the subsurface formations, i.e., "horizontal" refers to parallel to the bedding plane, and "vertical" refers to vertical to the bedding plane. Where the beds of the formation are dipping, the anisotropy axis is taken to be the normal to the bedding plane. When the borehole is inclined to the bedding plane, data from the orientation module 36 in FIG. 1, may be used to correct the resistivity measurements made by the resistivity imaging tool to give measurements parallel to and perpendicular to the bedding planes.

Those versed in the art would recognize that the resistivity measurements made by the electrode-pad system described above may be in error and, in particular, may need to have a scaling factor applied to the data. When this data is acquired, it may be calibrated by relating the values given by equations (3) and (4) to data from an induction logging tool or a propagation resistivity tool.

Referring again to FIG. 5, an induction or wave propagation tool is used to make measurements of the vertical and horizontal resistivity of the earth formations 104. For example, U.S. Pat. No. 5,781,436 to Forgang et al , the contents of which are fully incorporated here by reference, discloses a method an apparatus for making measurements of horizontal and vertical resistivities of a transversely isotropic formation.

The method disclosed by Forgang et al comprises selectively passing an alternating current through transmitter coils inserted into the wellbore. Each of the transmitter coils has a magnetic moment direction different from the magnetic moment direction of the other ones of the transmitter coils. The alternating current includes a first and a second frequency. The amplitude at the first frequency has a pre-determined relationship to the amplitude at the second frequency. The relationship corresponds to the first and the second frequencies. The method includes selectively receiving voltages induced in a receiver coil having a sensitive direction substantially parallel to the axis of the corresponding transmitter coil through which the alternating current is passed. A difference in magnitudes between a component of the received voltage at the first frequency and a component of the voltage at the second frequency is measured, and conductivity is calculated from the difference in magnitudes of the components of the received voltage at the two frequencies. The Forgang patent is cited only by way of example of an induction device for obtaining horizontal and vertical resistivities of a formation and there are other teachings on obtaining these properties of subterranean formation.

An example of a propagation resistivity tool for making measurements of horizontal and vertical resistivities is described by Rosthal (U.S. Pat. No. 5,329,448) discloses a method for determining the horizontal and vertical conductivities from a propagation logging device. The method assumes that $\theta$, the angle between the borehole axis and the normal to the bedding plane, is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model, an attenuation and a phase shift for the two receivers are calculated. An iterative scheme is then used to update the initial conductivity model until a good match is obtained between the model output and the actual measured attenuation and phase shift.

Figure 5:
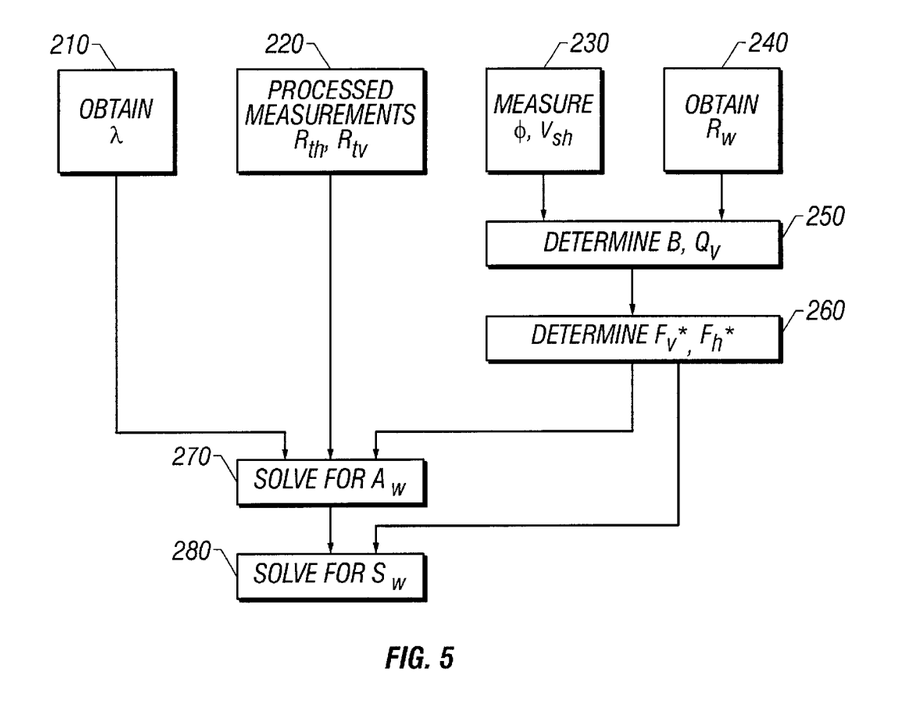
FIG. 5 gives the steps of one subprocess of an embodiment of the invention for determination of water saturation from measured values of vertical an horizontal resistivities.

The horizontal and vertical resistivities obtained at 104 are then inverted to give a layered model of resistivities 106. U.S. Pat. No. 5,854,991 issued to Gupta et al, the contents of which are fully incorporated here by reference, discloses such a method for inversion of transverse electromagnetic induction well logging measurements. Co-pending U.S. patent application Ser. No: 09/052,462 having the same assignee as the present application, and the contents of which are fully incorporated herein by reference, discloses a method of inversion of data from propagation resistivity tools. The '462 application also discloses an ambiguity in the inversion of the resistivity measurements and a method for dealing with the ambiguity.

In the inversion method used by Gupta et al, model is generated of the axial distribution of the horizontal and vertical conductivities, from induction signals acquired by the instrument using two-frequency alternating current. The model is generated by calculating an initial estimate of the conductivity distribution and axially inverting the estimate with respect to the measurements made using the two-frequency alternating current. Shoulder correction is applied to measurements made by the instrument using single-frequency alternating current. An estimate of the radial distribution of the conductivities is generated from the shoulder corrected induction signals acquired using the single- frequency alternating current. A 2-dimensional model is made of the conductivity distribution from the model of axial distribution and from the estimate of radial distribution. In one embodiment of the present invention, the initial model for the inversion is based at least in part on data acquired by the resistivity imaging tool 105. In particular, while the resistivity imaging tool may need to be normalized in some way to correct the resistivity measurements, the layer boundaries determined by the resistivity imaging tool serve as a good starting point for the layers used in the inversion of the transverse induction logging tool data. In another embodiment of the invention, the initial layers for the model may be determined from other high resolution logging tools, such as a Laterolog™ or a gamma ray logging too.

The two-frequency induction signals are corrected for near wellbore effects using two-frequency whole space responses calculated using the 2-dimensional model. The corrected two- frequency signals are then axially inverted to generate a 2-dimensional model. Using the corrected two-frequency signals in place of the acquired signals, all the previous steps are repeated until differences between the corrected two-frequency induction signals from successive repetitions (iterations) of the steps fall below a predetermined threshold. The two-dimensional model extant when process is halted becomes the final two-dimensional model.

Once the inversion is performed, the horizontal and vertical resistivities obtained therefrom are analyzed using a petrophysical model 108. In one embodiment of the invention, the values of vertical and horizontal resistivity thus obtained are related to the fluid content and fractional volume of pore spaces in subsurface layers by expressions such as the following derived from the Patchett-Herrick water saturation model for shaly sand formations:

$$\frac{1}{R_{t_{horiz}}} = (1 - V_{sh})\left[\frac{BQ_v S_w}{F^*_{horiz}} + \frac{S_{w_i}^{m*}}{F^*_{horiz}R_w}\right] + \frac{V_{sh}}{R_{sh}} \quad (5)$$

gives the horizontal resistivity in the reservoir-rock (non-shale) layers of the formation. $F^*_{sd,h}$ in equation (5) represents the formation resistivity factor for the horizontal resistivity, and $B \cdot Q_v$ is a factor related to the resistivity of "dispersed" shale (shale located within the pore spaces of the reservoir rock). $V_{sh}$ represents the fractional volume within the earth formation of interest of the layers of shale ("laminated shale volume"). The other terms represent the same quantities as described in the Background section herein. See for example, J. G. Patchett et al, "Introduction Section III. Model Evaluation", SPWLA Shaly Sand Reprint Volume, Society of Professional Well Log Analysts, Houston, Tex. (1982) and M. H. Waxman et al, "Electrical Conductivities in Oil Bearing Shaly Sands", SPE Journal, vol. 8, no. 2, pp. 107–122, Society of Petroleum Engineers, Richardson Tex., (1968). The porosity can be determined by any one of a number of well known measurements, such as acoustic travel time, neutron porosity, bulk density, or combinations of measurements such as these as is well known in the art. The porosity measurements just described are meant only as examples of measurements used to determine the porosity and are not meant to limit the invention in any way.

Similarly, for the vertical resistivity, $Rt_{ver}$, an expression relating the vertical resistivity to the water saturation $S_w$ is:

$$R_{t_{ver}} = (1 - V_{sh})\left[\frac{BQ_v S_w}{F^*_{ver}} + \frac{S_w^{n*}}{F^*_{ver} R_w}\right]^{-1} + V_{sh} R_{sh} \quad (6)$$

Note that equation (5) is written in a form relating to conductivity (inverse of resistivity) rather than in a form related to resistivity because as is known in the art, the signal measured by an induction logging instrument, where eddy currents are induced substantially along layer perpendicular to the wellbore, is related in magnitude to the sum of the conductivities of the individual layers. Conceptually this can be thought of as current passing through a set of resistors connected in parallel. Conversely, equation (6) is expressed in terms of resistivity, because where eddy currents are induced in a direction perpendicular to the layers, the effect of layering on the magnitude of the induction signal is similar to passing electrical current through a set of resistors connected in series. These effects of laminated shale/reservoir rock on the measurements of resistivity is described for example, in J. D. Klein et al, "The Petrophysics of Electrically Anisotropic Reservoirs", The Log Analyst, May–June 1997, Society of Professional Well Log Analysts, Houston, Tex.

In one embodiment of the invention, it has been determined that whatever the values of resistivity in the "horizontal" and "vertical" directions, the water saturation, $S_w$, must be equal whether determined from the vertical or horizontal resistivity measurements. A set of relationships can be developed, where a simplifying variable $A_w$ can be defined as:

$$A_w = \frac{S_w^n + BQ_v S_w R_w}{R_w} \quad (7)$$

and these expressions in terms of conductivity in the reservoir (non shale) layers, $C_t$, are:

$$C_{t_{hor}} = (1 - V_{sh})\frac{A_w}{F_{hor}} + V_{sh} C_{ch_{hor}} \quad (8)$$

$$C_{t_{ver}}^{-1} = (1 - V_{sh})\frac{F_{ver}}{A_w} + V_{sh} C_{sh_{ver}}^{-1} \quad (9)$$

$$C_{sh_{hor}} = \lambda_{sh}\left[\frac{1}{C_{t_{ver}} V_{sh}} - \frac{(1 - V_{sh}) F_{ver}}{A_w V_{sh}}\right]^{-1} \quad (8)$$

where $\lambda_{sh}$ represents an "anisotropy factor" relating the vertical and horizontal conductivities (or resistivities) in the same formation.

The expressions in equations (8) and (9) can be rearranged into a second order polynomial expression of $A_w$:

$$A_w^2\left[1 - \frac{V_{sh}}{F_{hor} C_{t_{ver}}}\right] - $$
$$A_w\left[\frac{C_{t_{hor}}}{C_{t_{ver}}} + (1 - V_{sh})^2 \frac{F_{ver}}{F_{hor}} - V_{sh}^2 \lambda_{sh}\right] + [(1 - V_{sh}) C_{t_{ver}} F_{ver}] = 0 \quad (11)$$

where it should be noted, significantly, that the value of conductivity (or resistivity) of the shale, $C_{sh}$, is absent. Equation (9) can be readily solved for $S_w$ to provide a calculation of the water saturation (and its complement, the hydrocarbon saturation) in the non-shale layers which does not require explicit determination of the resistivity (or conductivity) of the shale layers in the reservoir earth formation of interest. The $C_t$ terms in equation (9) represent total conductivity (electrical conductivity of both the shale and reservoir rock portions of the earth formation of interest).

Turning now to FIG. 5, a flow chart of the subprocess for determination of water saturation according to one embodiment of the invention using the Patchett-Herrick model is depicted. Using a logging tool such as disclosed in the '436 patent measurements are made within a borehole. The logging tool makes measurements of induction signals along and perpendicular to the axis of the instrument as well as cross-component signals. As described above, these measurements are processed to give a "horizontal" and "vertical" resistivity 220 at each depth in the borehole. A measurement of the connate water resistivity $R_w$ is obtained 240. Using the value of $R_w$ and a measured value 230 of porosity $\Phi$ and $V_{sh}$, the quantities B and $Q_v$ are determined 260 using a relationship given by Juhasz. These, together with the values of $\Phi$ enable the determination of $F_{horz}$ and $F_{vert}$ using the Waxman-Smit and Patcher-Herrick equations. These are substituted in equation (9) along with the measured values of $R_{tvert}$ and $R_{thorz}$ and an assumed anisotropy factor $\lambda_{sh}$ 210 and solved to give the value of $A_w$ 250. By substituting this value of $A_w$ in equation (5) along with values for B, $Q_v$ and $R_w$, the water saturation $S_w$ is obtained 270.

Another embodiment of the invention uses an orthogonal tensor model based on electrical anisotropy ($R_v/R_h$) instead of one based on single scalar parallel conductivity models. The tensor model is easily implemented for isotropic and anisotropic shales with isotropic sands. For the solution of anisotropic sand and shale, the laminar shale volume must be determined from some external model such as Thomas-Stieber or image log data. True laminar sand porosity must also be derived from the Thomas-Stieber (1975) model and is essential to true laminar reservoir characterization. The tensor model uses the Waxman-Smits equation to evaluate the laminar sand component and utilizes the Hill, Shirley, and Klein (1979) equation to derive $Q_v$ from the dispersed clay bound water fraction. The final result of this two-step resistivity tensor model is consistent with the scalar model originally proposed by Patchett and Herrick. However, it should be noted that, in this model the laminar sand resistivity component is derived directly from the tensor model and is implicitly linked to the correct laminar shale volume.

Figure 6:
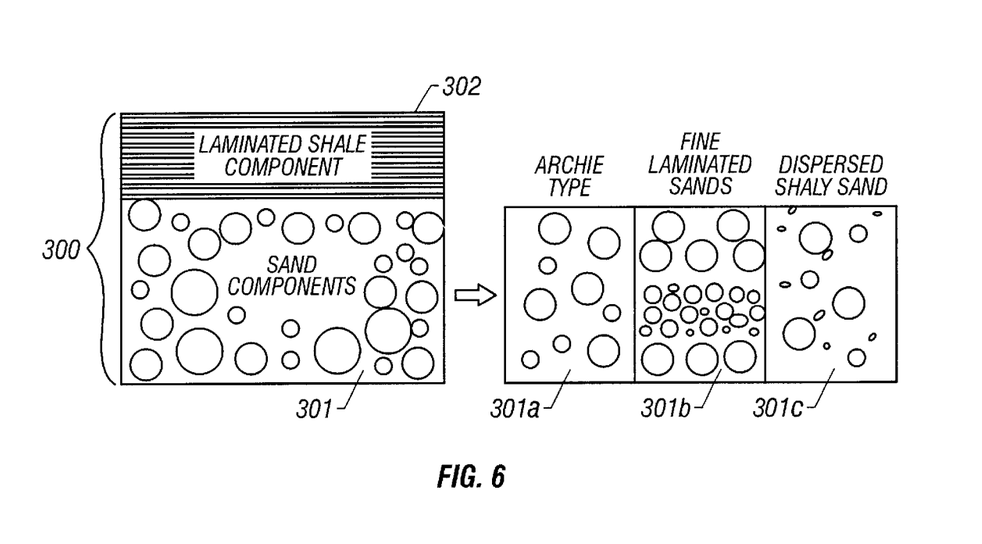
FIG. 6 is a schematic illustration of the components of the tensor petrophysical model of the present invention.

FIG. 6 illustrates a laminated formation 300 comprising interbedded sand 301 and shale layers 302. For illustrative purposes, only a single sand and a single shale layer are shown for representing the overall makeup of the formation. The sand may further comprise a clean Archie type sand 303a having poor sorting (i.e., different grain sizes), a fine laminated sand 303b that includes laminae of well sorted sand with differences in grain size between the individual laminae, and a dispersed shaly sand 303c having shale dispersed therein.

Electrical anisotropy is the direct, measurable result of the laminar shale volume and conductivity or variable water saturation within the sand (as established by prior investigators). In the case of thinly laminated reservoirs, the tensor model is volumetrically correct and provides a more accurate description of the laminar sand component by directly determining conductivities in both horizontal and vertical directions.

The tensor model used herein focuses primarily on the determination of laminar sand properties and hydrocarbon saturation calculation of the interbedded sand layers. The presence of hydrocarbons in shales, (source rocks) that could result in anisotropy, is not considered. The model assumes macroscopic anisotropy because the dimension of laminae is less than the vertical resolution of the measurement. Intrinsic anisotropy within the individual sand laminae is also considered in a general case. The tensor model is two dimensional and only 'vertical' anisotropy is considered. Laminae or beds are assumed to be horizontally or 'laterally' isotropic.

The tensor model is implemented in a two-step process. The first step of analysis permits the decoupling of the determination of laminar shale volume, laminae resistivities, and laminar sand properties including porosity, dispersed clay volume, Qv, etc. The determination of saturation is made in a second step in order to allow the application of different sets of assumptions or models to the data The initial step of the analysis is a simple, laminated sand-shale calculation of the fractional laminar shale volume $V_{sh-1}$, and the fractional laminar sand volume expressed as $N/G=1-V_{sh-1}$. All laminar sand conductivities and fractional volumes are determined at this point and are used as input for the saturation calculation. The second step of the analysis calculates the laminar sand component hydrocarbon saturation. Sand properties can be described as a clean, homogeneous Archie (1942) sand or as a dispersed shaly sand using the Waxman-Smits (1968) equation. The combination of this two-step analysis results in a robust tensor model determination of laminar sand resistivity and saturation determination, from Waxman-Smits, using true sand laminar porosity as proposed by Patchett and Herrick (1982).

The following terms are used in the tensor petrophysical model:

| | |
|---|---|
| $C_{t,h}$, $C_{t,v}$ | Horizontal and vertical conductivity |
| $\lambda = C_{t,h}/C_{t,v}$ | Anisotropy ratio, horizontal and vertical conductivity |
| $C_{sd,h}$, $C_{sd,v}$ | Horizontal and vertical conductivity of the sand component |
| $\lambda_{sd} = C_{sd,h}/C_{sd,v}$ | Anisotropy ratio of the sand |
| $C_{sh,h}$, $C_{sh,v}$ | Horizontal and vertical conductivity of the shale component |
| $V_{sh-1}$ | Volume fraction of the laminated shale |
| $1 - V_{sh-1} = N/G$ | Volume fraction of the sand |
| $\chi_h = C_{sh,h}/C_{sd,h}$ | Shale/sand conductivity ratio. |

The equations for the two conductivity components in both horizontal and vertical directions are:

$$C_{t,h} = C_{sd,h}[1 + {}_1V_{sh-1}(\chi_h - 1)]. \quad (12)$$

and $$C_{t,v} = C_{sd,h}\lambda_{sd}^{-1}\left[1 + V_{sh-l}\left(\chi_h^{-1}\frac{\lambda_{sh}}{\lambda_{sd}} - 1\right)\right]^{-1} \quad (13)$$

The sand and the shale related terms in equations (12)–(13) are separated to emphasize the main components of interest.

The macroscopic anisotropy ratio is $$\lambda = \lambda_{sd}\left[1 + V_{sh-l}B - V_{sh-l}^2\left(1 + B - \frac{\lambda_{sh}}{\lambda_{sd}}\right)\right] \quad (14)$$

with $$B = \chi_h + \chi_h^{-1}\frac{\lambda_{sh}}{\lambda_{sd}} - 2 \quad (15)$$

The forward modeling is derived from normalized parameters by the defined dimensionless anisotropy parameters: $\lambda$, $\lambda_{sd}$, $\lambda_{sh}$ The sand normalized conductivities are:

$$\frac{C_{t,h}}{C_{sd,h}} = 1 + V_{sh-l}\left(\frac{C_{sh,h}}{C_{sd,h}} - 1\right) \quad (16)$$

$$\frac{C_{t,v}}{C_{sd,v}} = 1 + V_{sh-l}\left(\frac{C_{sd,v}}{C_{sh,v}} - 1\right)^{-1} \quad (17)$$

and the normalized anisotropy ratio is $$\frac{\lambda}{\lambda_{sd}} = 1 + V_{sh-l}B - V_{sh-l}^2\left(1 + B - \frac{\lambda_{sh}}{\lambda_{sd}}\right) \quad (18)$$

LAMINAR SHALE VOLUME AND SAND CONDUCTIVITY

As noted above, the first step in using the tensor petrophysical model is the determination of laminar shale volume and sand conductivity from the measured anisotropy data and total conductivity in the horizontal and vertical directions, $C_{t,h}$ and $C_{t,v}$. The sand and shale conductivities in both horizontal and vertical directions ($C_{sd,h}$, $C_{sd,v}$, $C_{sh,h}$, and $C_{sh,v}$) are calculated from these data. Additionally, the volumetric sand and shale parameters, i.e., $V_{sh}$ and N/G, must be derived. Depending upon the available data and any additional information about the sand and shale properties, three cases are considered.

Case A

Shale and sand are both anisotropic. To derive the sand conductivities in both the horizontal and vertical directions ($C_{sd,h}$, $C_{sd,v}$) from the composite formation conductivities, $C_{t,h}$ and $C_{t,v}$, the two shale conductivities ($C_{sh,h}$, and $C_{sh,v}$) are determined from log data in a representative shale interval and the laminated shale content $V_{sh-1}$ from additional input such as Thomas-Stieber. Given these additional formation parameters, the sand conductivities can be calculated $$C_{sd,v} = C_{t,v}\frac{(1 - V_{sh-l})C_{sh,v}}{C_{sh,v} - V_{sh-l}C_{t,v}} = C_{t,v}\frac{(1 - V_{sh-l})}{1 - V_{sh-l}\frac{C_{t,v}}{C_{sh,v}}} \quad (19)$$

and $$C_{sd,h} = \frac{C_{t,h} - V_{sh-l}C_{sh,h}}{1 - V_{sh-l}} \quad (20)$$

CASE B

Shale is anisotropic and the sand is isotropic. The sand conductivity $C_{sd}$ and the laminated shale content $V_{sh-1}$ can be calculated from the composite formation conductivities, $C_{t,h}$ and $C_{t,v}$ given the two shale conductivities, $C_{sh,h}$, and $C_{sh,v}$:

$$C_{sd} = \frac{1}{2}\left\{(C_{sd}^a + C_{sh,h}) \pm [(C_{sh,h} - C_{sd}^a)^2(1 + \Delta C)]^{1/2}\right\} \quad (21)$$

where $$C_{sd}^a = C_{t,v}C_{sh,h} - \frac{C_{t,h}}{C_{sh,v} - C_{t,v}} \quad (22)$$

and $$\Delta C = 4C_{sd}^{a}C_{sh,h} - \frac{C_{sh,v}}{(C_{sd}^{iso} - C_{sh,h})^2} \quad (23)$$

In equation (21), the + sign is taken if $C_{sd} < C_{sh,v}$ and the − sign is taken if $C_{sd} > C_{sh,v}$. $C_{sd}^{a}$ is defined as "apparent sand conductivity." If the shale is isotropic, $C_{sh,h} = C_{sh,v}$, then this conductivity is identical to the true sand conductivity. The term $\Delta C$ is the correction for anisotropic shale. For isotropic shale where $C_{sh,h} = C_{sh,v}$, $\Delta C$ becomes zero. The laminar shale content can be calculated using $$V_{sh-l} = \frac{C_{t,h} - C_{sd}}{C_{sh,h} - C_{sd}} \quad (24)$$

or $$V_{sh-l} = \frac{C_{sh,v}}{C_{t,v}} C_{t,v} - \frac{C_{sd}}{C_{sh,v} - C_{sd}} \quad (25)$$

CASE C

Both the sand and shale are isotropic. In this case, two solutions are possible, depending upon which a priori information is available. In the first solution, the shale conductivity $C_{sh}$ is assumed while in the second solution, the laminated shale volume $V_{sh-1}$ is determined from an independent source such as Thomas Stieber model or the resistivity image data. The laminated shale content is calculated from equation (24) while the sand conductivity is obtained from $$C_{sd} = C_{t,v}C_{sh} - \frac{C_{t,h}}{C_{sh} - C_{t,v}} \quad (26)$$

The sand and shale conductivities are calculated from the input laminar shale volume from the following equations:

$$C_{sd} = \quad (27)$$

$$\frac{C_{t,h} + C_{t,v}(1 - 2V_{sh-l})}{2(1 - V_{sh-l})} \pm \left\{ \left[ \frac{C_{t,h} + C_{t,v}(1 - 2V_{sh-l})}{2(1 - V_{sh-l})} \right]^2 - C_{t,v}C_{t,h} \right\}^{1/2}$$

and $$C_{sh} = V_{sh-1}[C_{t,v}^{-1} - (1 - V_{sh-1})C_{sd}^{-1}]^{-1} \quad (28)$$

The second step in the application of the tensor model is the analysis of the laminar sand reservoir component. Water saturation of the laminar sand is a function of the 'true' laminar sand porosity, electrical properties, and laminar sand conductivity and can be calculated using various published relationships or other models such as effective medium or electrical efficiency. In this model, the Waxman-Smits equation is applied to quantitatively correct for dispersed clay conductivity in the sand. This equation reduces to Archie's equation when dispersed clay is not present.

The intrinsic electrical properties of the anisotropic sand component, formation factor (m*) and saturation exponent (n*), are a function of the measurement direction and resulting saturation profiles. The saturation exponent is not constant over the full range of water saturation. Waxman-Smits equations for the horizontal and vertical direction are:

$$Swt_{sd}^{n^*,v} = \left[ \frac{a^* \cdot R_w}{\phi_{T,sd}^{m^*,v} \cdot (1 + Rw \cdot B \cdot Qv_{disp,sd} \cdot Swt_{sd}^{-1}) \cdot Rt_{v,sd}} \right] \quad (29)$$

$$Swt_{sd}^{n^*,h} = \left[ \frac{a^* \cdot R_w}{\phi_{T,sd}^{m^*,h} \cdot (1 + Rw \cdot B \cdot Qv_{disp,sd} \cdot Swt_{sd}^{-1}) \cdot Rt_{h,sd}} \right] \quad (30)$$

This assumes that the water saturations of different sand laminae vary or that the volumes of sand comprising the two different saturations In a preferred embodiment of the invention, saturations and relative sand volumes are assumed constant and the vertical an horizontal cementation and saturation exponent are assumed constant. The water saturation for an isotropic sand is:

$$Swt_{sd}^{8} = \left[ \frac{a^* \cdot R_w}{\phi_{T,sd}^{m^*} \cdot (1 + Rw \cdot B \cdot Qv_{disp,sd} \cdot Swt_{sd}^{-1}) \cdot Rt_{sd}} \right] \quad (31)$$

$Q_v$ ($Qv_{disp,sd}$) of the laminar sand fraction can be determined from the Hill, Shirley, Klein (1979) equation or the Juhasz (1986) equation shown here where $C_o$ is NaCl concentration of the formation water in g/l or kppm.

$$Swb_{disp,sd} = \frac{\phi_{CBW-disp,sd}}{\phi_{T,sd}} \quad (32)$$

$$Qv_{disp,sd} = \frac{Swb_{disp,sd}}{\left[ \frac{0.6425}{C_o^{1/2}} + 0.22 \right]} \quad (33)$$

"True" laminar sand porosity can be derived from total porosity using density data from a density log or an NMR log and the methodology outlined by Thomas Stieber (1975) and demonstrated by Juhasz (1981)

$$\phi_{T,sd} = \frac{\phi_T - \phi_{sh} \cdot V_{sh,l}}{(1 - V_{sh,l})} \quad (34)$$

where

| | |
|---|---|
| $C_W$ | Conductivity of the formation water |
| $R_W$ | Inverse of $C_W$, formation water resistivity |
| $\phi_{Total}$ | Total porosity of the formation |
| $\phi_{T,sd}$ | Thomas-Stieber porosity of laminar sand |
| $Swt_{sd}$ | Total water saturation of laminar sand |
| a*, m*, n* | Clay corrected Archie parameters, anisotropic sand being noted with subscripts (h, v) |
| $Qv_{disp,sd}$ | Cation exchange capacity per unit pore volume (meq cm$^{-3}$) of the dispersed clay |
| $\phi_{CBW-disp,sd}$ | Porosity fraction of bound water associated with dispersed clay |
| B | Equivalent ionic conductance of clay-exchange cations |
| $SWb_{disp,sd}$ | Bound water saturation of the dispersed clay fraction only |

While the foregoing disclosure is directed to the preferred embodiments of the invention, various modifications will be apparent to those skilled in the art. While specific embodiments of the resistivity imaging tool and induction logging tool have been discussed above, it is to be understood that the tools may be used either on a wireline or in an MWD environment. It is to be further understood that the anisotropy measurements discussed above with reference to an induction logging tool may also be obtained using a propagation resistivity tool. It is intended that all variations within the scope and spirit of the appended claims be embraced by the foregoing disclosure.

What is claimed is:

1. A method of determining a parameter of interest of a subsurface formation containing a sand and a shale surrounding a borehole, the method comprising:
   (a) conveying an electromagnetic logging tool into the borehole and using at least one transmitter and one receiver on the tool to obtain measurements indicative of a horizontal and vertical resistivity of the formation;
   (b) obtaining a value for a total porosity of said formation, a fractional volume of the shale in said formation, and a resistivity of the shale in the formation,
   (c) using a processor for processing said measurements for obtaining a vertical and horizontal resistivity of the formation;
   (d) using a tensor petrophysical model in a processor for obtaining from said vertical and horizontal resistivities, said obtained total porosity, said obtained fractional shale volume and said obtained shale resistivity, the parameter of interest wherein said tensor petrophysical model comprises a laminar isotropic shale and a laminar sand that is at least one of (i) a clean sand, and, (ii) a sand having dispersed shale therein.

2. The method of claim 1 wherein the parameter of interest is at least one of (i) a porosity of said sand, (ii) a water saturation of said sand, (iii) a fractional volume of laminated shale, and (iv) a fractional volume of dispersed shale.

3. The method of claim 1 wherein said electromagnetic logging tool comprises at least one transmitter for inducing an electromagnetic field in the formation and at least one receiver for providing a signal indicative of the induced electromagnetic field, said at least one transmitter and said at least one receiver including coils oriented in mutually orthogonal directions.

4. The method of claim 1 wherein said total porosity is obtained from at least one of (i) a density logging tool, (ii) a Nuclear Magnetic Resonance tool, (iii) an acoustic logging tool, and (iv) a neutron logging tool.

5. The method of claim 1 wherein said fractional shale volume in the formation is obtained from at least one of (i) a gamma ray logging tool, a Nuclear Magnetic Resonance tool, (iii) a density logging tool, (iv) a neutron logging tool, (v) an acoustic image of the borehole, (vi) an electrical image of the borehole, and (vii) a microresistivity logging tool.

6. The method of claim 1 wherein said resistivity of shale in the formation is obtained using one of (i) a focused resistivity tool, and (ii) a galvanic tool having button electrodes thereon.

7. The method of claim 1 wherein obtaining a vertical and horizontal resistivity of the formation further comprises using the tensor petrophysical model for obtaining a laminar shale volume, a laminar sand volume, and a laminar sand conductivity.

8. The method of claim 7 wherein obtaining the parameter of interest further comprises using a dual water model for determining a fractional volume of dispersed shale, a total porosity of the laminar sand, and an effective porosity of the laminar sand.

9. The method of claim 8 wherein obtaining said parameter of interest further comprises using the Waxman-Smits equation.

10. The method of claim 1 wherein the logging tool is selected from the group consisting of (i) a galvanic tool, (ii) an electromagnetic induction tool, and, (iii) an electromagnetic propagation resistivity tool.

11. The method of claim 1 further comprising using a sensor on the logging tool for obtaining an orientation of the tool relative to the subsurface formations and using the determined orientation in obtaining said horizontal resistivity and said vertical resistivity.

12. The method of claim 1 further comprises performing an inversion of the obtained vertical and horizontal resistivities of the formation.

13. The method of claim 12 wherein performing an inversion further comprises:
   (i) defining a model including a plurality of layers, each of said plurality of layers having a thickness, a horizontal resistivity and a vertical resistivity; and
   (ii) iteratively updating the model based on a difference between an output of the model and said obtained horizontal and vertical resistivities.

14. The method of claim 13 further comprising conveying a resistivity imaging tool into the borehole and using measurements therefrom for defining an initial model.

15. The method of claim 13 wherein performing the inversion further comprises applying a shoulder correction.

16. The method of claim 14 wherein defining an initial model further comprises averaging the measurements from the resistivity imaging tool over a depth sampling interval.

17. The method of claim 14 wherein the measurements from the resistivity logging tool are limited to those in the proximity of a strike direction of the subsurface formation.

18. The method of claim 12 wherein performing an inversion further comprises obtaining more than one possible solution to the inversion and resolving an ambiguity therein.

19. A method for determining hydrocarbon saturation of an earth formation comprising layers of shale interleaved with layers of reservoir rock, the method comprising:
   (a) determining a vertical resistivity of said earth formation;
   (b) determining a horizontal resistivity of said earth formation;
   (c) determining a porosity of said layers of reservoir rock; and
   (d) determining a hydrocarbon saturation independent of resistivity of said layers of shale by combining said vertical resistivity, said porosity and said horizontal resistivity.

20. The method as defined in claim 19 wherein said layers of reservoir rock include dispersed shale in pore spaces therein and said hydrocarbon saturation is calculated using a relationship which accounts for dispersed shale.

21. The method as defined in claim 20 wherein said model comprises the Patchett-Herrick model.

22. The method as defined in claim 19 wherein said steps of measuring said vertical and horizontal resistivity comprise:
   (a) measuring induction signals along an axis of a wellbore drilled through said earth formations;
   (b) measuring induction signals perpendicular to said wellbore axis;
   (c) measuring cross-component induction signals; and
   (d) determining said vertical and said horizontal resistivities using said induction signals measured along and perpendicular to said axis and said cross-component induction signals.

23. A method of obtaining a porosity and water saturation of at least one sand layer in a reservoir comprising laminated sands and shales in a subsurface formation surrounding a borehole, the method comprising:
  (a) conveying an electromagnetic logging tool into the borehole for obtaining measurements indicative of a horizontal and vertical resistivity of the formation;
  (b) obtaining a value for a total porosity of said formation, a fractional volume of the shale in said formation, and a resistivity of the shale in the formation;
  (c) using a processor for processing said measurements and obtaining therefrom a layered model of vertical and horizontal resistivities of the formation;
  (d) using a petrophysical model for determining from the layered model of vertical and horizontal resistivities the porosity and water saturation of said sand.

24. The method of claim 23 wherein obtaining a resistivity of shale further comprises conveying a galvanic tool having button electrodes thereon into the borehole and averaging in a vertical direction and in a horizontal direction measurements made by said button electrodes.

25. The method of claim 24 wherein layers of said formation have a strike direction and wherein said averaging is limited to measurements made by button electrodes disposed substantially along said strike direction.

26. The method of claim 23 wherein said electromagnetic logging tool is selected from the group consisting of (i) an induction logging tool, and, (ii) a propagation resistivity tool.

27. The method of claim 23 wherein said electromagnetic logging tool is conveyed in the borehole on one of (i) a wireline, and, (ii) a drillstring.

28. A method of determining a parameter of interest of a subsurface formation containing a sand and a shale surrounding a borehole, said subsurface formation having a total porosity, a fractional volume of the shale in said formation, a resistivity of the shale, a vertical resistivity and a horizontal resistivity; the method comprising using a tensor petrophysical model in a processor for obtaining from said vertical and horizontal resistivities, said obtained total porosity, said obtained fractional shale volume and said obtained shale resistivity, the parameter of interest wherein said tensor petrophysical model comprises a laminar isotropic shale and a laminar sand that is at least one of (i) a clean sand, and, (ii) a sand having dispersed shale therein.

29. The method of claim 28 wherein the parameter of interest is at least one of (i) a porosity of said sand, (ii) a water saturation of said sand, (iii) a fractional volume of laminated shale, and (iv) a fractional volume of dispersed shale.

30. The method of claim 28 wherein obtaining said parameter of interest further comprises using the Waxman-Smits equation.

* * * * *